May 23, 1939. C. Y. FITZGERALD 2,159,760

TREE HOLDER

Filed July 15, 1938

Cecil Y. Fitzgerald
INVENTOR.

BY
ATTORNEY.

Patented May 23, 1939

2,159,760

UNITED STATES PATENT OFFICE 2,159,760

TREE HOLDER

Cecil Y. Fitzgerald, Monrovia, Calif., assignor of one-third to David G. Brand, Monrovia, Calif., and one-third to William L. Davis, Pasadena, Calif.

Application July 15, 1938, Serial No. 219,395

7 Claims. (Cl. 248—46)

This invention relates to an improved means attachable to the base portions of Christmas trees, standards, or other elongated objects to maintain such objects in upstanding positions.

An object of the invention is to provide a device of this kind which may be more easily and quickly folded up from its operative position into a compact position for storing or shipping.

Another object is to provide an improved assembly of basal stabilizing members which are swingable in a novel manner from extended stabilizing positions to compact, retracted positions.

Yet another object is to combine with the extensible stabilizing members a simplified and improved stop means to keep said members from moving towards their retracted positions while the device is in use.

Still another object is general simplification of structure and also a simplification of pattern, whereby fewer differences of pattern are required for the parts making up the complete assembly, thus lowering cost of manufacture.

Other objects, advantages, and features of invention may hereinafter appear.

Referring to the accompanying drawing, which illustrates what is at present deemed to be a preferred embodiment of the invention, Fig. 1 is a perspective view of the device in its operative position with the base bars extended to stabilize the socket member preparatory to utilizing said member to support in an upstanding position the trunk of a Christmas tree or other elongated object.

Figure 3:
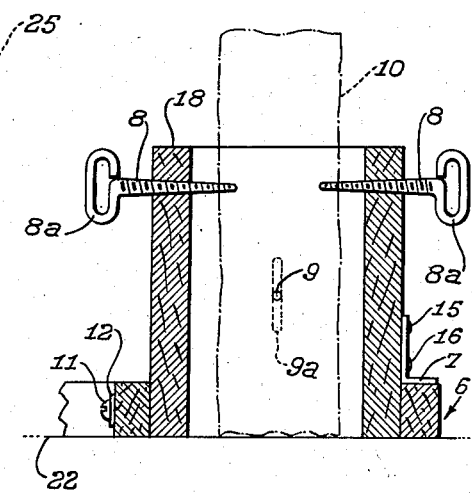
Fig. 3 is a vertical mid-section taken on the plane indicated by the lines 3—3 on Fig. 1. In this view, broken lines indicate the outline of a tree trunk being held in an upright position by the device.

In the embodiment of the invention illustrated in the drawing, the main parts of the device are the socket member 5, shown as a box-like structure having an open top and open bottom; the base bars 6 pivotally attached to the exterior of the lower part of said socket member; the stop members 7, which hold said bars 6 against swinging to their retracted positions while the device is in use; and the impaling members 8 and 9, shown as screws projecting through the walls of the socket member and adapted to penetrate the tree trunk 10 outlined in Fig. 3, to maintain said trunk 10 (or other elongated object) in an upright position.

The socket member 5 and base bars 6 may be made of wood, in which case it is desirable to use headed screws 11 furnished with washers 12, to pivotally fasten said base bars to said socket member. Each of these screws passes loosely through one end portion of a base bar and is directed into a lower corner portion of the box or socket member 5, being so positioned as to aid in maintaining such bar, when the extended position shown in Fig. 1, with its under side substantially in alinement with the lower end of said box and with its pivoted end flush with the adjacent corner thereof. Each of these four base bars are shown as having a length considerably greater than the horizontal dimension of the square box 5 in order that such bar, when in its extended position, may be an effective aid in stabilizing the structure to prevent it being overturned by lateral stresses directed against a tree or other object held in an upstanding position by the tapered impaling screws 8 and 9. Each base bar 6 is shown chamfered at 13 at its pivoted end in order that it may be swung downwardly from its extended position without binding upon the projecting portion of the base bar adjacent to this point, and at its free end each base bar is preferably furnished with an upwardly and outwardly directed bevel 14 to avoid exposing a sharp corner at the extremity of the extended bar. The stop members 7 desirably consist of L-shaped metal clips secured to the corner portions of the box 5 by nails 15 and 16. Each nail 15 is shown directed into the outer end of a tongue portion 17 of one wall 18 of the box while the nail 16 extends into the adjacent edge portion of the adjoining box wall 18. The provision of the tongues 17 results in a right angled recess 20 being formed along one vertical edge of each upstanding box wall into which recess fits the corner portion of the adjacent box wall. Of course, additional fastening means than the nails 15 and 16 may be provided, if desired, to hold together the walls of the box.

The oppositely disposed pair of tree impaling screws 8 are spaced considerably above the like pair of oppositely disposed impaling screws 9 in order more securely to hold the tree in an upright position with its lower end resting upon the ground or floor 22. The screws 8 and 9 are respectively furnished with flattened or looped heads 8a and 9a for convenient manual operation.

Figure 1:
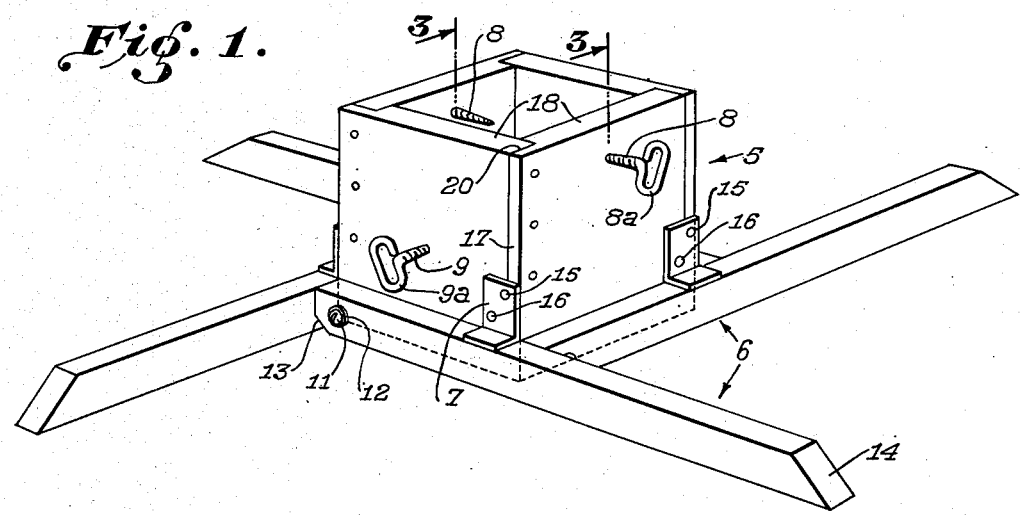
Figure 2:
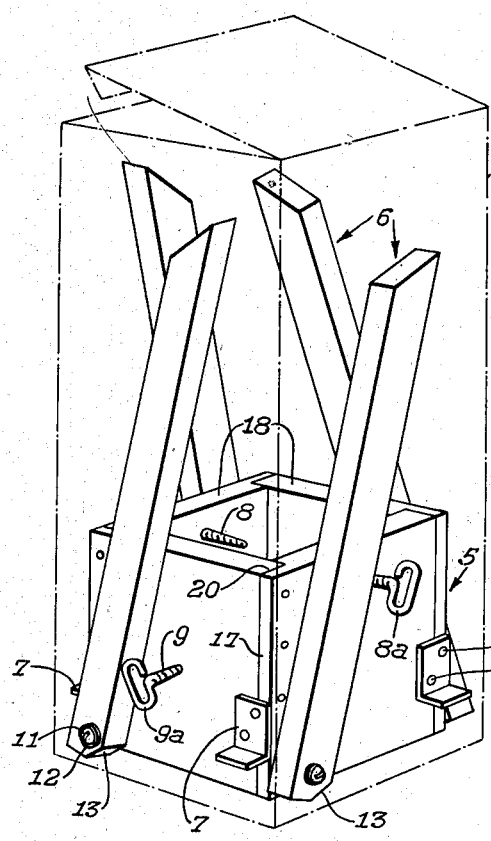
Fig. 2 is a perspective view of the device showing the base bars retracted in such a manner as to prepare the article for placing within a carton, a carton enclosing the same being outlined in broken lines.

In order to move the base bars 6 from their extended floor engaging positions shown in Fig. 1 to their folded up positions shown in Fig. 2, each bar is swung away from its stop clip 7 through an angle of about 270 degrees. This can readily be accomplished by first swinging all of said bars down to a pendant position. After this has been done, one bar will not obstruct the final upswing of another whereby the bars are brought into the grouped position shown in Fig. 2 preparatory to housing the folded device within the carton 25 which is delineated by broken lines in this view. The outwardly projecting portions of the screws 8 and 9 serve as stop means to arrest the swinging movements of the bar 6 in their folded up positions.

It should be understood that the present disclosure is for the purpose of illustration only and that this invention includes all modifications and equivalents which fall within the scope of the subject matter claimed.

What is claimed is:

1. In a device of the kind described, a socket member disposable in a position to receive the base portion of a tree or other elongated object in an upstanding position, a plurality of base bars having one end pivotally fastened to the lower portion of said member and swingable from a retracted position to an extended position wherein they occupy approximately the same horizontal plane as the lower end of said socket member when the latter is positioned as aforesaid, the free end of one bar extending outwardly beyond the pivoted end of an adjacent bar, and means extending outwardly from the outer face of said socket member and being engageable by an intermediate portion of each bar to restrict the further swinging thereof when it has reached the operative limit of its swing.

2. In a device of the kind described, a socket member consisting of a rectangular box disposable to receive the base portion of a tree or other elongated, upstanding object within the area bounded by its sides, a plurality of base bars pivotally fastened to each corner of the lower portion of a side of said box and swingable between extended and retracted positions, the lower side of each of said bars when extended approximately alining with the lower edge of a side of said box, and stop means extending outwardly beyond the outer face of said socket member to hold the extended bars from swinging beyond the operative limit of their swing.

3. The subject matter of claim 2 and, said stop means consisting of clips secured externally to lower corner portions of said box.

4. In a device of the kind described, a member having an upwardly opening socket, the exterior outline of said member as viewed in plan being substantially rectangular, means to hold an upstanding tree in place without said socket, a set of four base bars, each bar of said set being pivotally connected with an exterior lower corner portion of said member, and stop means carried by said member and positioned to arrest the upward swing of each of said bars thus to maintain such bar in a substantially horizontal operative position to overlie longitudinally a floor or other flat supporting surface, thereby stabilizing said socket member against tipping, each of said bars being swingable away from its said stop means through an angle of 270 degrees to an upstanding retracted position.

5. The subject matter of claim 4 and, each of said bars having at its pivoted end a corner portion which is beveled to unobstruct in relation to an adjacent extended bar the initial part of its swinging movement from the extended toward the retracted position.

6. In a device of the kind described, a socket member disposable in a position to receive the base portion of a tree or other elongated object in an upstanding position, a plurality of base bars pivotally fastened to the lower portion of said members and swingable from a retracted position to an extended position wherein they occupy approximately the same horizontal plane as the lower end of said socket member when the latter is positioned as aforesaid, and two pairs of oppositely disposed impaling screws, the screws of each of said pairs extending horizontally through opposite side portions of said socket member in position to impale a tree trunk between them, one pair of said screws being at a higher level than the other, said screws having externally projecting portions which arrest the swinging movements of said bars when the latter are in a folded up position.

7. A tree holder comprising a socket member consisting of a rectangular casing providing an enclosure with an open top, a stabilizing bar pivotally fastened to the lower corner portion of each side of said socket member to swing from a substantially vertical position to a horizontal position, clips fastened to lower corner portions of said holder opposite to the pivotal location of said bars, said clips having a flange to arrest the swing of each bar at a predetermined point whereby to aline a side of a bar with the base of said holder, and means extending inwardly and outwardly from each side of said holder at different elevations, said inwardly projecting means supporting a tree in an upstanding manner in said socket and said outwardly projecting means arresting the swing of said bars in their upstanding position, said bars being adjustable to a horizontal position wherein their free end portions project outwardly beyond said socket enclosure.

CECIL Y. FITZGERALD.